Figure 11:
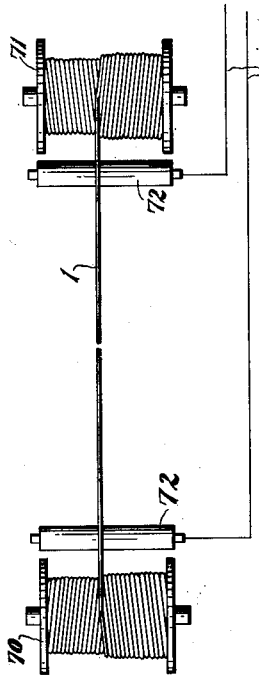

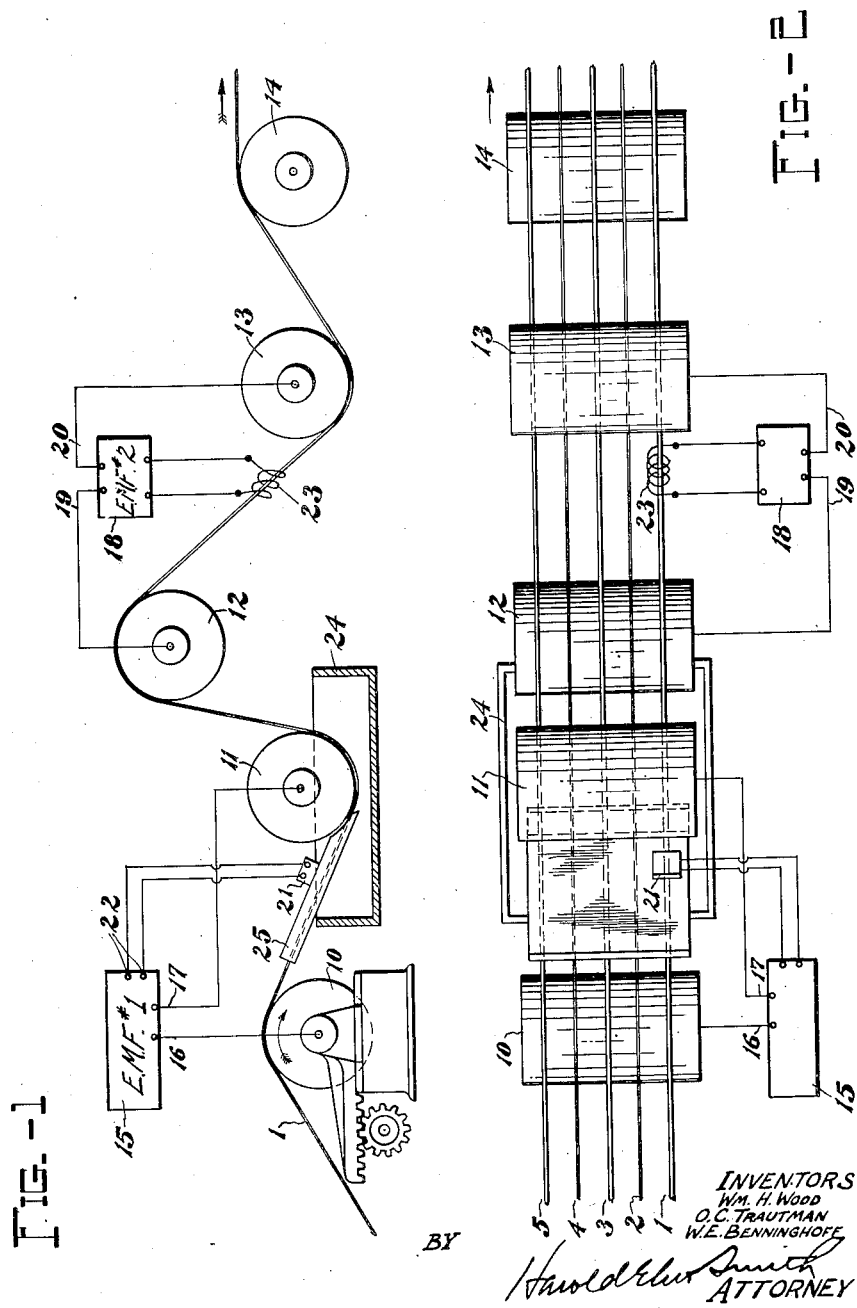

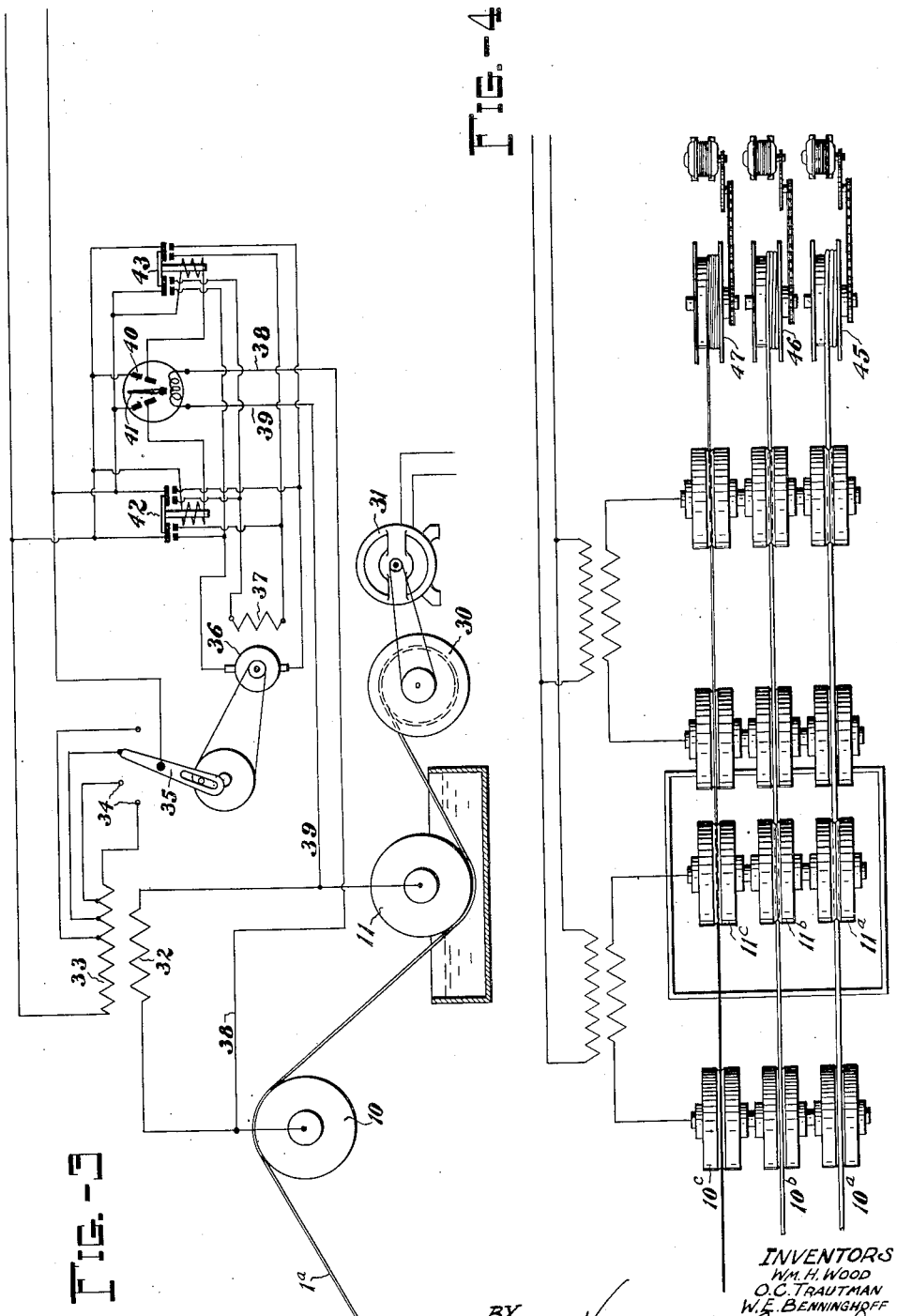

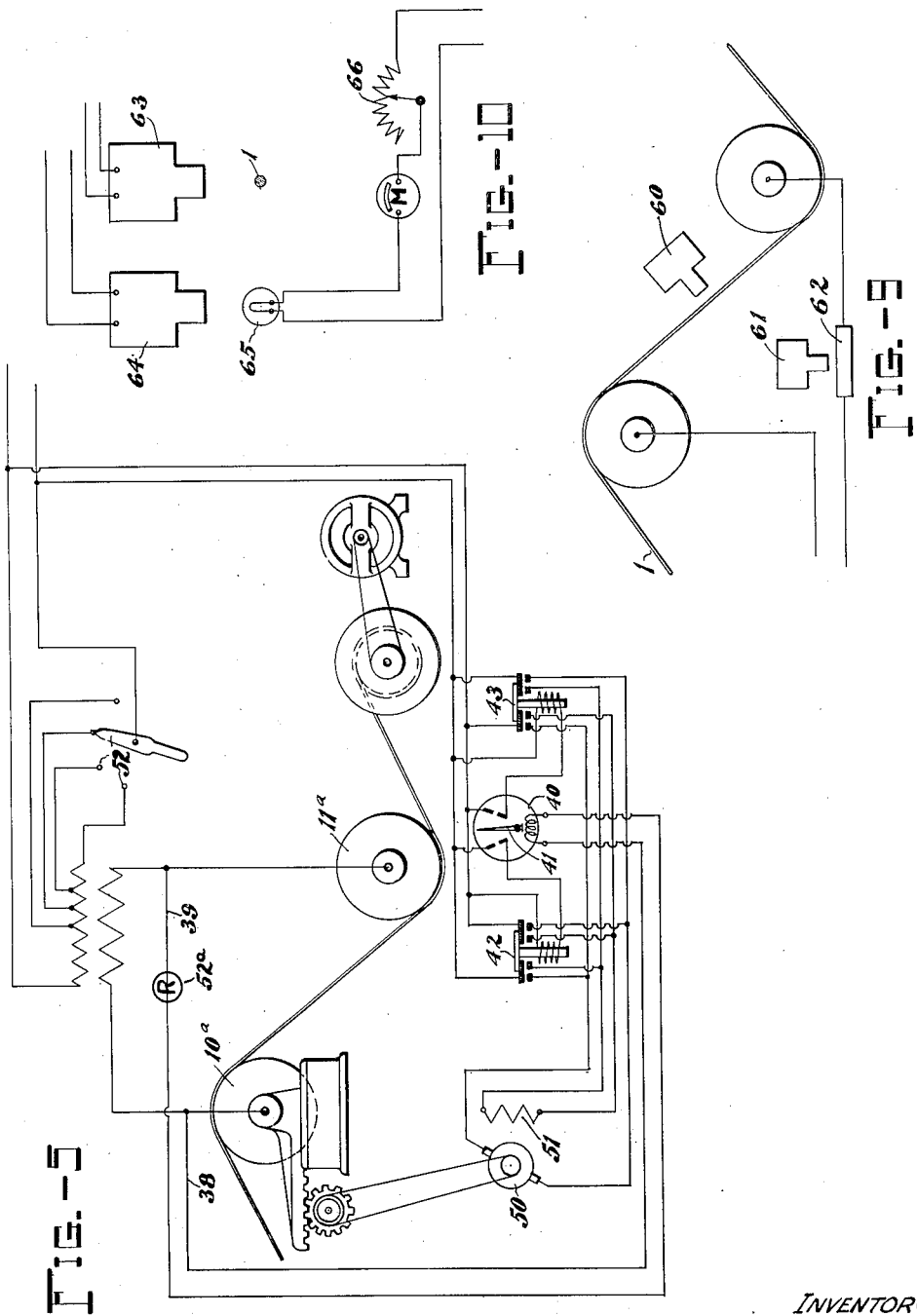

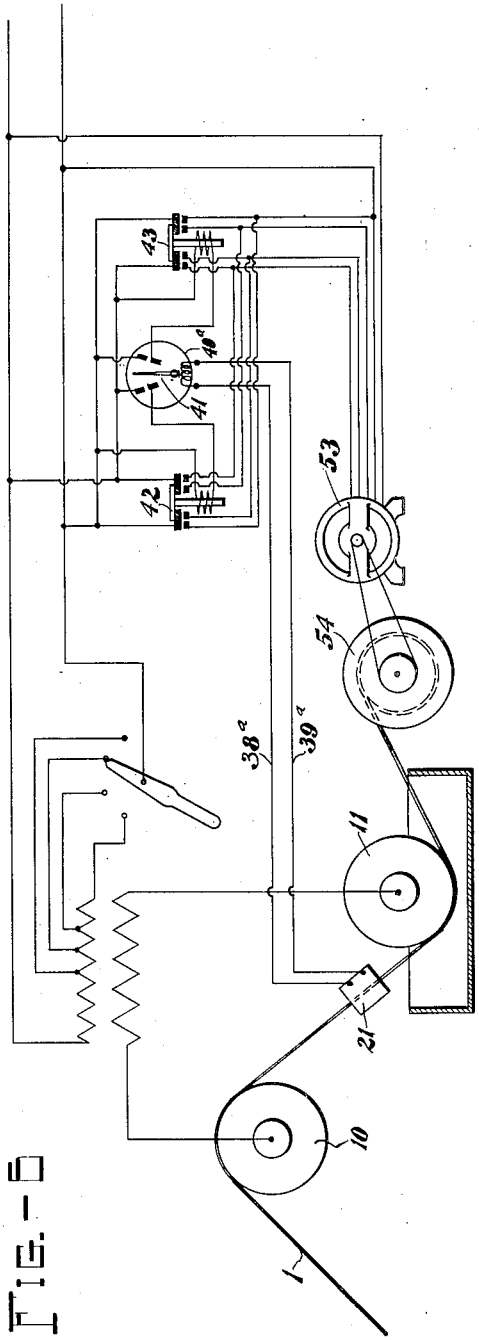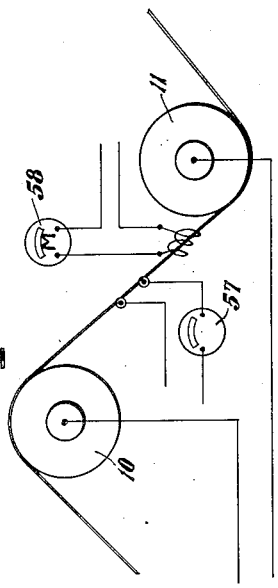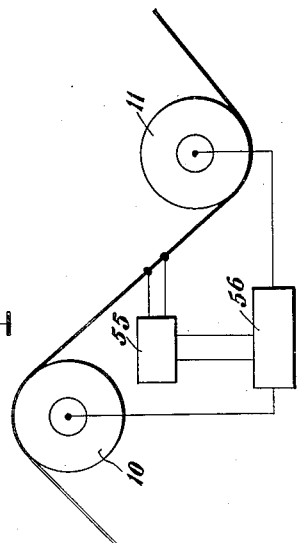

Nov. 28, 1933.  W. H. WOOD ET AL  1,937,420
APPARATUS FOR HEAT TREATING WIRE
Filed April 20, 1932   5 Sheets-Sheet 5

INVENTORS
WM. H. WOOD
O. C. TRAUTMAN
W. E. BENNINGHOFF
BY Harold Elus Smith
ATTORNEY Patented Nov. 28, 1933

1,937,420

UNITED STATES PATENT OFFICE 1,937,420

APPARATUS FOR HEAT TREATING WIRE

William H. Wood, South Euclid, Oscar C. Trautman, Parma, and William E. Benninghoff, Lakewood, Ohio; said Trautman and Benninghoff assignors to said Wood Application April 20, 1932. Serial No. 606,494

10 Claims. (Cl. 219—11)

This invention relates to annealing and heat-treatment of wires and has for its object the provision of a new, improved and simplified apparatus for heating the wire more rapidly and economically than heretofore while also protecting it from oxidation or discolorization; subsidiary objects of the invention relate to the control of the heating agent whereby a uniform temperature is obtained and thereby a uniform product; the provision of new expedients in combination with such control method for automatically controlling the temperature; while further objects and advantages of the invention will become apparent as the description proceeds.

In the drawings accompanying and forming a part of this application we have shown in rather diagrammatic fashion certain typical apparatus embodying our improvements. Fig. 1 illustrates the essential apparatus for hardening and tempering steel wire; Fig. 2 is a top plan of the apparatus shown in Fig. 1; Fig. 3 is a diagrammatic representation of self-controlling apparatus for heating wire of any kind; Fig. 4 is a top plan view of other apparatus showing the electrical connection coupled with the mechanical disconnection of a plurality of runs of wire; Figs. 5 to 10 inclusive are diagrammatic views which illustrate other modes of controlling temperature of the wire automatically; and Figs. 11, 12, 13, and 14 illustrate other arrangements of certain features of our invention.

A universal characteristic of our invention is the heating of the longitudinally moving wire by means of an electric current flowing through the wire itself and conveyed to and from the wire by means of rolling contacts which move with the wire. In the form of the invention shown in Figs. 1 and 2 a plurality of wires or strands 1, 2, 3, 4, 5, up to any desired number, are heated simultaneously, all the same moving longitudinally at equal speed and passing in transit over a metal roll 10, with which they make contact, under a metal roll 11 with which they make contact, over a metal roll 12 with which they make contact, and under a metal roll 13 with which they make contact. The roll shown at 14 is merely a direction-changing element, and the fact of contact is unimportant. A suitable source of E. M. F. 15 has its terminals 16 and 17 connected to the rolls 10 and 11 respectively; and a second independent source of E. M. F. 18, has its terminals 19 and 20 connected to the rolls 12 and 13 respectively. These sources of E. M. F. may be of any desired nature, such as primary batteries, storage batteries, independent generators, or the independent secondary coils of transformers, although the primaries of those coils need not be independent and can both be connected to one and the same circuit.

As a result of these sources of E. M. F. all the sections of all the different wires located between the rolls 10 and 11 and between rolls 12 and 13 are heated simultaneously and to exactly the same temperature, regardless of differences in the sizes of the wires. Whether the wires progress through the apparatus by pulling entirely upon one end or by supplying rotative power to the different rolls is unimportant; the temperature produced is a great deal more steady when plural wires are employed than when a single wire is heated. Steel wire, for example, such as is used for springs, despite all precautions, exhibits occasional flaws and non-metallic inclusions which change the electrical resistance, and in case an attempt be made to heat only a single such moving wire electrically, the increased resistance encountered at such a flaw or inclusion will greatly increase the temperature not only at that point but over several feet of wire, with the result that upon quenching the hardening effect is greatly modified; but when plural wires are employed, any increase in resistance of one wire merely produces a slight change in the distribution of the current without substantial change in the temperature of any of the wires. So far as the equalization of temperature is concerned the same substantial result would be achieved by the use of a stationary shunt connecting the two contact members, but in that case all the heat generated in that shunt connection would be lost whereas if that wire be included in the machine the heat generated therein is used profitably. Due to the balance existing between the conducting cross-section, which varies with the square of the diameter, and the radiating surface which varies with the first power of the diameter, the net heating effect of the current per foot of moving wire is exactly the same in the different wires regardless of their diameter, so that in the case of a row of wires all moving together, the position of luminosity in the different wires is abreast of each other, merely flickering longitudinally a trifle with variations in the local composition or condition of the separate wires. To such an extent is this true that it is sufficient for most controlling purposes to base the control upon a single wire when numerous wires are used as indicated in Figs. 1 and 2 wherein a temperature-responsive element 21 of any suitable nature is located adjacent the wire 1 and suitably connected to the source 15 by means of terminals 22 provided for the purpose; similarly the source of E. M. F. 18 is controlled by means of a heat-responsive element 23 suitably connected to the source 18. So many different modes of connection are possible that those skilled in the art will understand numerous ways to effect this although a few specific suggestions are contained in subsequent figures of the drawings. The roll 11 is sometimes submerged in quenching liquid contained in a tank 24 so that all the wires receive exactly the same quenching effect; and all the wires defined between rolls 12 and 14 are heated to the same temperature and thereby tempered to the same extent. We have shown the hottest portion of the wires defined between rolls 10 and 11 as covered by a shield 25 to reduce loss of heat radiation.

Numerous arrangements may be employed for the purpose of controlling the temperature. In Fig. 3 this is done by voltage-control, viz: the wire 1a is drawn over a rolling contact element 10 and under a rolling contact-element 11 and finally rolled on a spool 30 by a motor 31. The source of E. M. F. is the secondary 32 of a transformer, the terminals whereof are connected to the elements 10 and 11; the primary 33 of the transformer is provided with a variable section connected by suitable wires with contact-points 34 with which cooperates a contact-arm 35 operated by the reversible motor here typified by an armature 36 and a field coil 37. Connected to the elements 10 and 11 are wires 38 and 39, respectively, which are attached to a sensitive voltmeter 40 whose indicator 41 energizes relays 42 or 43 depending upon whether it approaches one or the other limit of its movement, these serving to connect the reversible motor to move the arm 35 in appropriate direction.

In Fig. 4, we have shown simultaneous heating of three wires by electrical contact-means which are electrically connected but mechanically disconnected, the drums 45, 46, 47 being independently rotated and the various contact-elements 10a, 10b, 10c, 11a, 11b, 11c, etc. being independently rotatable according to different speeds of the wires but electrically connected so as to secure the benefit of the current equalization heretofore described. This mechanical separation is not necessary because of any unequal heating requirement but more from unequal working requirements. For example one use for heating the wires is to anneal them between independent passages through wire-drawing dies. Due to accidental causes, such as the rate of drawing wires of different sizes, or the accidental breakage of wires it is desirable in some cases like this to have the strands move independently.

In handling brass, copper, steel, iron, and the other common wires, a rather large amperage is used with a rather small voltage which renders it entirely safe to connect and disconnect the wires regardless of their electrical connections.

In Fig. 5, we have shown an arrangement for automatic control of the temperature of the wire based upon its length. The contact-element 10a is movable by rack and pinion means to and from the contact-element 11a, this movement being effected by the armature 50 of a reversible motor whose field is shown at 51. The contact elements are, as above, connected by wires 38 and 39 with a sensitive voltmeter 40 whose movable element 41 operates relays 42 or 43 to energize the motor to increase or decrease the distance between the contact-elements as may be necessary to compensate for too slow or too fast heating. We have here shown a variable inductance device 52 connected in the primary of the transformer by which the main heating current is produced in order to enable manual adjustment of the wire temperature to whatever normal degree may be desired. Suitable means, such as another manually adjustable resistance element 52a in the circuit which includes the voltmeter 40, serves to compensate for manual changes in the electromotive force due to the adjustment 52.

In Fig. 6, we have shown an arrangement for automatic control of the temperature of the wire based upon its speed of advance. In this apparatus a temperature-sensitive element 21 is connected by wires 38a and 39a with a current-sensitive instrument 40a whose movable element 41 operates relays 42 or 43 to increase or decrease the speed of the motor 53 which rotates the drum or reel 54 on which the wire 1 is wound. Fig. 7 is a diagrammatic view showing another arrangement for controlling the temperature of the wire including a thermo-couple 55 operatively connected to the source 56 of E. M. F. whereby heating current is supplied to the wire. No attempt has been made to indicate the exact mode of associating the thermo-couple with the wire or setting forth the detailed manner of its control over the electromotive force, inasmuch as detailed modes of accomplishing these ends are well understood in the art and those skilled therein can make the necessary connections without special instructions. Fig. 8 illustrates diagrammatically a resistance-measuring device 57 by which the heat of the wire can be controlled; and 58 indicates a magnetic element whereby the same result can be secured, since it is known that the resistance and magnetism of wire varies with the temperature.

In Fig. 9, we have shown a temperature-control mechanism including a radiation instrument 60 mounted in operative relation to the wire 1, and a radiation instrument 61 mounted in operative relation with a radiation block 62 connected in series with said wire. Instrument 60 operates by direct heat emanated from the wire and instrument 61 is operated by the heat from the block 62, but the heat from the block 62 changes in proportion to that from the wire.

In Fig. 10, we have illustrated a control connection depending upon a comparison produced by photoelectric cells which are mounted as a part of the radiation instruments 63 and 64 respectively. Instrument 63 is concentrated upon the wire 1, instrument 64 upon a lamp 65 whose intensity can be varied by the rheostat 66, after which the wire 1 is kept automatically at a similar pitch of radiation intensity.

Figure 12:
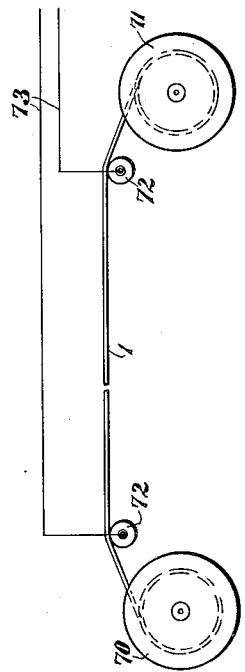

In Figs. 11 and 12, we have illustrated an even simpler apparatus wherein the wire 1 is drawn from one spool 70 to another spool 71, passing over some rolling contacts 72 by which current is caused to pass through the same from the circuit wires 73—73. This arrangement is highly satisfactory for such wires as copper and brass which sometimes have to be annealed without quenching.

Figure 13:
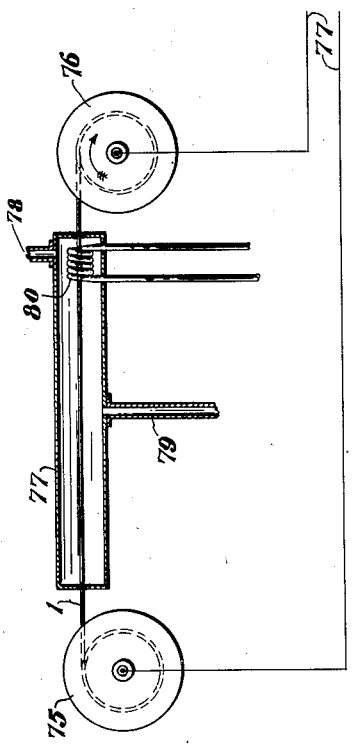

In Fig. 13, we have illustrated another arrangement wherein the wire 1 is wound from a metal spool 75 to a second metal spool 76, the circuit wires 77 being connected directly to those spools; and to keep the wire from oxidizing it is passed through a tube 77 to which a suitable dry inert or reducing gas is supplied by way of the tube 78 and from which any excess of such gas is withdrawn by way of the tube 79. The inflow tube 78 is located at the hot end, and in a case of fine wire the cooling effect of the gas (which may be nitrogen or hydrogen or illuminating gas or natural gas) is often sufficient to cool the wire so as to prevent oxidation after its emergence from the tube, even though it should be exposed to heating current for a few inches before reaching the contact spool. Another mode of chilling the wire, usable when larger wire is employed, is a pipe coil 80 encircling the same, and supplied with cooling fluid. It is, of course, obvious that cooling could be effected by submerging the spool 76 in water, but this is sometimes undesirable since quenching in water discolors brass or copper wires and may corrode ferrous metal. In the case of very fine wires it is specially desirable to lead the current directly to the terminal spools as shown in Fig. 13, and advance the wire rapidly. Multiplying the number of strands is also entirely feasible though not so important in brass or copper as in the case of steel, since the latter tends to show more flaws and faults. In the case of larger heavy wires, it is usually better to pass them over a separate rolling contact element. In any case the wires are preferably bent about the contact members whether one or many and whether these contact members be spools or intermediate rolls, thus producing a substantial area of contact without any sliding or scratching, which in the case of stationary contacts would injure the wire and entails less tension on the wire which is important with hot wire.

Figure 14:
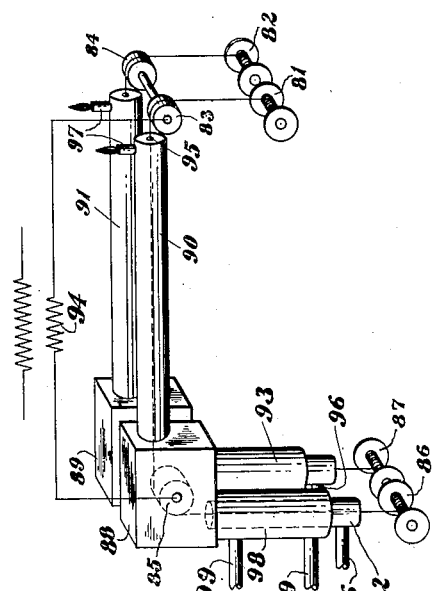

In Fig. 14, we have shown another arrangement for bright annealing. The wires pass from the reels 81, 82, over metal rolls 83, 84, then over other reels 86, 87. The rolls 85 are enclosed in gas-tight casings 88, 89, from which extend tubes 90, 91, which surround the oncoming wires and other tubes 92, 93 which surround the retreating wires. The rolls 83, 84 are connected together electrically as also are the rolls 85, and to them, respectively, are connected the two terminals of a source 94 of E. M. F. such as the secondary of a transformer. The ends of the tubes 90—91 are provided with closures having small apertures 95 therein through which the wires pass snugly. Inlet connections 96 carried by the tubes 92, 93, serve for the introduction of some reducing or hydrocarbon gas, e. g. hydrogen, or illuminating gas. Tiny jets 97 are shown on tubes 90 and 91 since a constant flame at each jet shows the gas composition to be correct. In the case of fine wires the heat loss to the rolls 85 and casings may be sufficient, complete with the cold gas to reduce the temperature sufficiently inside the tubes 92, 93 to avoid discoloration in the open air. In the case of larger wires we employ cold jackets 98 supplied with cooling fluid by way of the circulation pipes 99. The colors of brass and copper wires are very delicate and are changed by even slight heating in air or by any moisture content, for which case the gas used must be very dry. In some cases, however, where special treatments are desired, we provide other compositions of gas. For example, by the use of a determined mixture of air and steam it is possible to produce a coating on ferrous metal wire which is black and highly resistant to atmospheric oxidation, wherefore we control the gas composition according to the end in view.

Having thus described our invention what we claim is:

1. The method of heating metallic wires which contains the step of passing an electric current in multiple circuit from a single source of electromotive force through a plurality of stretched substantially parallel sections of the respective individual wires defined between electrically conducting elements and between which they are supported, and simultaneously causing said wires to advance longitudinally at such speed as shall serve under the electromotive force of the current and the resistance of the wire to enable the wires to acquire a determined temperature at a determined position between said conducting elements.

2. The improvement in heating wires by passing an electric current through a plurality of segments of such individual wires defined between spaced conducting elements and simultaneously moving said wires longitudinally from one of said elements to the other of said elements with which said wires make electrical contact, which is characterized by the simultaneous passage of the heating current through a plurality of wires arranged in multiple circuit relation between successive conducting elements.

3. Apparatus for heating wire comprising in combination spaced rotatable members of electrically conducting material of cylindrical form providing extended area of circumferential contact having conducting relation with longitudinally spaced portions of the wire to be heated freely supported between them, guiding means outwardly of said spaced portions of the wire for insuring extended contact with said rotatable conducting members, a source of electro-motive force, circuit connections from said source to said members respectively and means for simultaneously causing the rotation of said members and the movement of said wire longitudinally in the same direction as the peripheral movement of said members.

4. Apparatus for heating wire comprising in combination spaced rotatable members of electrically conducting material, a source of electromotive force, circuit connections from said source to said members respectively, a plurality of stretched substantially parallel single strands of each individual wire to be heated making contact with said members and arranged in multiple circuit relation between said members whereby the electrical circuit is completed through said source of electro-motive force, and means for causing the simultaneous movement of said wires longitudinally and of said members rotatively with the same speed and direction at the points of contact.

5. Apparatus for the simultaneous heating of a plurality of wires, comprising, in combination, means for causing all said wires to move longitudinally, metallic contact members of cylindrical form providing extended area of circumferential contact contacting said wires at longitudinally spaced points, a source of electro-motive force, and circuit-connections from said source to said contact members, there being a plurality of wires contacting with each contact member and constituting a multiple-circuit path for the current produced by said electro-motive force.

6. Apparatus for the simultaneous heating of a plurality of wires, comprising, in combination, means for causing all said wires to move longitudinally, metallic contact members contacting said wires at longitudinally spaced points, a source of electro-motive force, circuit-connections from said source to said contact members, there being a plurality of wires contacting with and extending between said contact members so as to produce a multiple circuit connection, and means responsive to the temperature of any of said wires at a determined point between said members for varying and fixing the relation existing between the speed of the wires and the electromotive force per unit length of wire included in such multiple circuit.

7. Apparatus for heating wire comprising in combination, a source of electro-motive force, two substantially cylindrical rotary contact-members spaced apart and connected to said source, guide means for a wire positioned outwardly of said contact-members, a wire to be heated positioned by said guide members and making contact with and bent over each of said members to provide arcuate contact of extended area and freely supported between and bridging the space between said members, and means for simultaneously moving said wire lengthwise from one contact-member to the other and rotating said contact-members in the same peripheral direction as the linear direction of the wire.

8. Apparatus for heating wire comprising in combination, a source of electro-motive force, two substantially cylindrical rotary contact-members spaced apart and connected to said source, guide means for a wire positioned outwardly of said contact-members, a wire to be heated, positioned by said guide members and making contact with and bent over each of said members to provide arcuate contact of extended area and freely supported between and bridging the space between said members, means for simultaneously moving said wire lengthwise from one contact-member to the other and rotating said contact-members in the same peripheral direction as the movement of the wire, a stationary jacket surrounding said wire, and means for supplying to said jacket an aeriform fluid of controlled composition, said jacket covering all parts of said wire which are heated to any discolorizing temperature.

9. Apparatus for heating wire comprising in combination, a source of electro-motive force, two substantially cylindrical rotary contact-members spaced apart and connected to said source, guide means for a wire positioned outwardly of said contact-member, a wire to be heated positioned by said guide members and making contact with and bent over each of said members to provide arcuate contact of extended area and freely supported between and bridging the space between said members, means for simultaneously moving said wire lengthwise from one contact-member to the other and rotating said contact-members in the same peripheral direction as the movement of the wire, a jacket surrounding at least a portion of that segment of the wire which is defined between said contact-members, and means for abstracting heat from said wire and for supplying to said jacket an aeriform fluid of controlled composition.

10. Apparatus for heating wire comprising in combination, a source of electro-motive force, two substantially cylindrical rotary contact-members spaced apart and connected to said source, guide means for a wire positioned outwardly of said contact-members, a wire to be heated positioned by said guide members and making contact with and bent over each of said members to provide arcuate contact of extended area and freely supported between and bridging the space between said members, means for moving said wire lengthwise from one contact-member to the other and rotating said contact-members at the same peripheral direction as the movement of the wire, a stationary jacket surrounding one of said contact members and a part of said wire between said contact members, means associated with said jacket for abstracting heat from said wire, and means for supplying to said jacket an aeriform fluid of controlled composition.

WILLIAM H. WOOD.
WILLIAM E. BENNINGHOFF.
OSCAR C. TRAUTMAN.